3,234,811
TRANSMISSION CONTROL SYSTEM
William E. Fritz, Rochester, and Keith H. Carpenter, Pittsford, N.Y., assignors to General Motors Corporation, Detroit, Mich., a corporation of Delaware
Filed Aug. 22, 1962, Ser. No. 218,784
10 Claims. (Cl. 74—472)

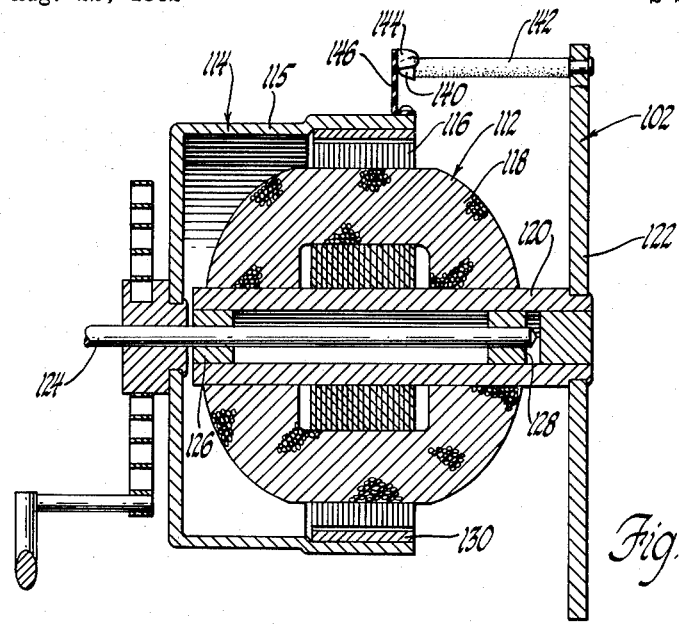
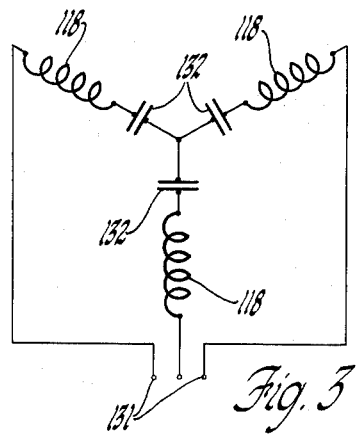
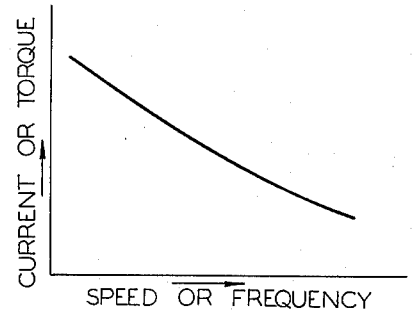
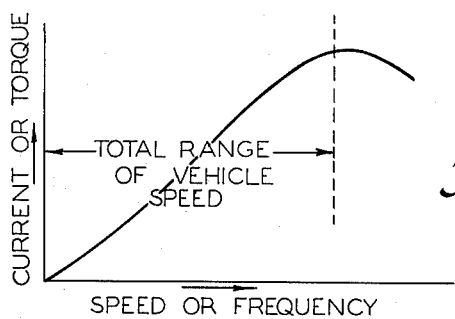
INVENTORS
William E. Fritz, &
Keith H. Carpenter
BY
Paul J. Ethington
ATTORNEY United States Patent Office 3,234,811
Patented Feb. 15, 1966

This invention relates to transmission control systems and more particularly to the combination of electrical and mechanical control systems therefor.

Control systems for varying drive through a transmission are well known in the prior art. One form of the prior art utilizes a governor which is responsive to variations in vehicle speed. The governor includes a plurality of flyweights and a plunger member movable axially in response to radial movements of the flyweights. The plunger is operatively connected with a switching means which in turn is operative to energize a relay coil upon a predetermined radial movement of the flyweights. The relay coil when energized is operative to actuate a shifting mechanism for varying drive through the transmission. However, a control system as described is subject to certain disadvantages, namely, that by positioning the governor on a vehicle certain undesirable shifting during vehicle maneuvers may result. In addition, an undesirable shift pattern may result due to mechanical hysteresis of such a control system.

Another form of the prior art for varying drive through a transmission utilizes means for developing voltage corresponding to vehicle speed. In addition, means are provided for developing a voltage corresponding to vehicle throttle position. Control means are provided for comparing the voltages and operative to develop a control voltage in accordance with the difference therebetween. A relay is connected with the control means and is operative in response to the control voltage to control ratio changing means so as to vary drive through the transmission. However, such a control system as described is dependent on the reliability of electrical components and in some cases may not be as reliable as a strictly mechanical control system.

In accordance with this invention, a novel control system incorporating mechanical and electrical means is provided for controlling drive through a vehicle transmission. Signal developing means are provided for developing a signal voltage having a frequency proportional to vehicle speed. A first force developing means is connected with the signal developing means and in response to the frequency of the signal voltage is operative to develop a first force in accordance with the frequency. A vehicle throttle connects the first force developing means with the second force developing means which is operative to develop a second force in accordance with the throttle setting whereby the second force acts in a direction opposed to that of the first force. Electrical switching means are provided associated with the first and second force producing means and adapted to be switched to a first condition when the second force is greater than the first force. A relay coil and a voltage source are connected together in series across the switching means so that when the switching means are switched to the first condition the relay coil is energized. In addition, a ratio changing means is provided and is operatively connected with and controlled by the relay coil for varying drive through the transmission.

A more complete understanding of this invention may be had from the detailed description which follows taken with the accompanying drawings in which:

FIGURE 2 is a plan view partly in section taken along lines 2—2 in FIGURE 1 looking in the direction of the arrows;

FIGURE 3 is a schematic circuit diagram illustrating the stator windings of the hysteresis motor without impedance changing means;

FIGURE 4 is a graphical representation of the torque versus frequency characteristic of a typical hysteresis motor without impedance changing means;

FIGURE 5 is a graphical representation of the torque versus frequency characteristic of the hysteresis motor with impedance changing means.

Figure 1:
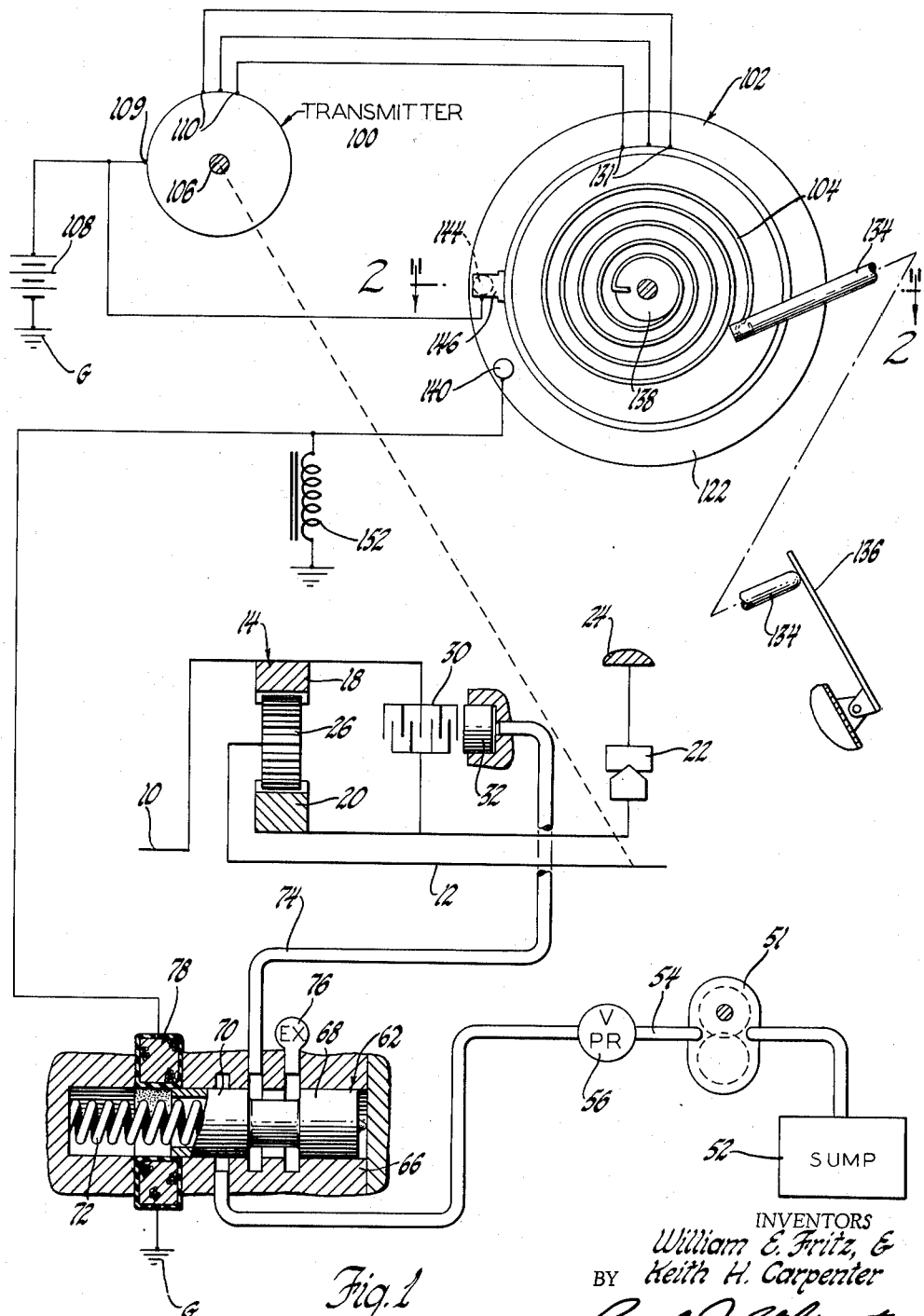
FIGURE 1 is a schematic diagram illustrating one embodiment of the invention.

Referring now to the drawings and more particularly to FIGURE 1, there is shown a driving shaft 10 which may appropriately be clutched to a vehicle engine, not shown, and a driven shaft 12 suitably connected to the vehicle wheels. A planetary gear unit 14 interconnects the shafts 10 and 12 so as to provide drive ratios therebetween.

The planetary gear unit 14 has an input ring gear 18 connected to the driving shaft 10 and a reaction sun gear 20 restrained from reverse rotation by a one-way device 22 which is grounded at 24. The one-way device 22 may be of any known construction utilizing sprags, rollers or the like, to prevent relative rotation between two members in one direction and allow relative rotation therebetween in the opposite direction. Intermeshing with the ring and sun gears 18 and 20, respectively, are a series of planet pinions 26 journaled on the driven shaft 12. With the sun gear 20 prevented from reverse rotation, the rotated ring gear 18 will revolve the driven shaft 12 in the same direction but at a reduced speed. Direct drive through the gear unit 14 is afforded by a clutch 30 positioned between the ring and sun gears 18 and 20, respectively. The clutch 30 may be of any conventional structure, such as the multi disc type illustrated, and engaged by a hydraulically operated servo motor 32. When the clutch 30 is engaged, the ring and sun gears 18 and 20, respectively, are caused to revolve together and as a result the unit 14 locks up with the driven shaft 12 being rotated at the same speed as the input ring gear 18.

Pressure fluid for operating the servo motor 32 is derived from a pump 51 preferably driven at engine speed. The pump 51 draws fluid from a sump 52 and discharges into a main supply line 54 in which is located a conventional pressure regulating valve 56. The regulating valve 56 operates in a known manner to maintain the pressure in the system substantially constant at some predetermined amount. Communicating with the main supply line 54 is a shift valve 62 housed within a bore in a valve body 66.

The shift valve 62 is of the spool type comprising spaced lands 68 and 70 and is biased to the depicted position by a spring 72. In this position the lands 68 and 70 establish communication between a servo supply line 74 and an exhaust port 76, thus draining the servo motor 32 and disengaging the clutch 30. To move the valve 62 to the left in FIGURE 1 a relay 78 is utilized, the winding of which is grounded at G. When the relay 78 is energized as will be explained hereinafter, the valve 62 is drawn to the left so as to reposition the lands 68 and 70. In the new position, communication between the main supply line 54 and the servo supply line 74 is permitted by the lands 68 and 70 and the exhaust port 76 is closed by land 68. With the valve 62 in this latter position the clutch 30 will be engaged by pressure fluid supplied to the servo motor 32.

In accordance with this invention, a control system is provided for energizing the relay coil 78 so as to vary drive through the transmission. The system as shown in FIGURE 1 includes a vehicle speed transmitter unit 100, a hysteresis motor 102 and a spiral spring 104.

The transmitter unit 100 may be of the form of a transmitter as described in a United States Patent No.

3,043,922, issued July 10, 1962, in the name of William E. Fritz et al. and assigned to the same assignee as this invention. The transmitter 100 has an input shaft 106 mechanically connected with the driven shaft 12. A direct voltage source 108 is connected between ground G and an input terminal 109 of the transmitter 100. As described in the aforementioned co-pending application, the transmitter 100 is operative to convert direct voltage into three phase alternating voltage of constant amplitude having a frequency which varies with the rotative speed of input shaft 106 and hence in this invention with vehicle speed. The output voltage from the transmitter 100 may be obtained from output terminals 110 of the transmitter 100.

The hysteresis motor 102 is shown in detail in FIGURE 2 and includes a stator 112 and a rotor 114. The stator 112 may be of conventional construction including a cylindrical laminated magnetic core member 116 having mounted thereon a three phase distributed winding 118 of conventional winding arrangement and configuration. The core structure 116 is mounted on a stationary hollow shaft 120 which is in turn suitably mounted to a support member 122. The rotor 114 includes a cup shaped aluminum member 115 suitably mounted to a shaft 124 supported by bearings 126 and 128 in the hollow stationary member 120 whereby the rotor 114 is free to rotate about the cylindrically shaped core member 116. An annular shaped ring 130 of magnetic material exhibiting a high hysteretic constant such as cobalt alloy steel containing cobalt of the order of 17% is press fitted in the cup shaped member 115.

Three phase voltage of constant amplitude and variable frequency is obtained from the output terminals 110 of the transmitter unit 100 and is applied to input terminals 131 on the hysteresis motor 102 which are electrically connected with the stator winding 118. Each phase of the winding 118 is excited by a different phase of the three phase excitation voltage appearing at the terminals 131. When the stator winding 118 is energized by the three phase alternating voltage from the transmitter unit 100 a revolving field approximately constant in space wave form is obtained in the winding. Because of the hysteresis of the annular ring 130 the magnetization of the ring 130 lags behind the inducing magnetomotive force wave. Therefore, the rotor flux wave lags behind the axis of the stator magnetomotive force wave by an angle as determined by the hysteretic material. The angle may be termed as a hysteresis angle. A torque will be produced acting on the ring 130 in a direction to decrease the hysteresis angle and will be proportional to the product of the fundamental components of the stator magnetomotive force and rotor flux and the sine of the hysteresis angle. However, since the frequency of the voltage obtained from the transmitter unit 100 varies with vehicle speed it is apparent that due to the inductance of the stator winding 118 the impedance of each phase will increase with frequency. Accordingly, since the voltage obtained from the transmitter unit 100 is maintained constant the current flowing in each phase of the winding 118 will decrease with speed and since the developed torque is dependent on the magnitude of current flowing in the winding 118 the output torque will decrease with speed. This characteristic is illustrated in FIGURE 4.

In accordance with this invention, impedance changing means are provided whereby the impedance of each phase of the winding 118 is varied to permit the developed torque to vary with speed. This is accomplished as shown in FIGURE 3 by connecting a capacitor 132 in series with each phase of the stator winding 118. The capacitance of each capacitor 132 is so chosen that over the range of vehicle speed the torque developed by the hysteresis motor will increase substantially linearly with vehicle speed. This characteristic is illustrated in FIGURE 5.

It is desirable that the electrical connections between the output terminals 110 of the transmitter 106 and the input terminals 131 of the hysteresis motor 102 are made so that rotative movement of the rotor 114, as depicted in FIGURE 1, is in a counterclockwise direction as excitation frequency increases.

The spiral spring 104 as illustrated in FIGURES 1 and 2 has one end connected with a rod 134 which is in turn operatively connected to a vehicle throttle or accelerator pedal 136. The other end of the spiral spring 104 is connected with an end member 138 on the rotor 114. Upon depression of the accelerator pedal 136, the spiral spring 104 is operative to develop a torque acting in a clockwise direction about the axis of rotation of the rotor 114, as depicted in FIGURE 1, so as to oppose rotation of the rotor 114 in a counterclockwise direction.

A first electrical contact 140 of magnetic material is suitably mounted to the support member 122 with a reed 142 of mechanically rigid insulating material. Similarly, a second electrical contact 144 of magnetic material is mounted to the rotor 114 with a suitable reed 146 of mechanically rigid insulating material. The reed 142 is of sufficient length to permit overlapping contact between contacts 140 and 144 and thereby act as a stop to limit rotative movement of the rotor 114. The direct voltage source 108 is connected between ground G and the electrical contact 144. The contact 140 is connected with the winding of the relay 78. A contact holding relay coil 152, operatively associated with the contacts 140 and 144 as will be apparent from the following description of operation, is connected between ground G and the electrical contact 140.

The operation of the transmission control system as shown in FIGURE 1 will be apparent from the following description. Upon a throttle setting as desired by the operator, the accelerator pedal 136 will be depressed so as to bias the spiral spring 104 which develops a torque acting in a clockwise direction to oppose counterclockwise rotative force of the rotor 114. When the vehicle speed as sensed by the transmitter unit 100 increases to the desired amount for upshifting the vehicle the rotative force of the rotor will be sufficient to overcome the opposing torque of the spiral spring 104 so as to thereby effect closing of contacts 140 and 144. With the contacts 140 and 144 in electrical contact with each other current will flow from the source 108 through the contacts 144 and 140 and the winding of the relay 78 to the other side of the source 108 so as to thereby energize the relay 78. With the relay 78 energized the drive through the transmission will be varied in the manner as described hereinbefore. In addition, current will also flow from the source 108 through the contacts 144 and 140 and through the holding relay coil 152 to the other side of the source 108 so as to thereby energize the holding relay coil 152. Thus a magnetic field is created by the current flowing in the coil 152 and its flux path includes the magnetic material of the contacts 140 and 144 whereby the contacts are attracted toward each other to thereby maintain electrical contact therebetween. The attractive magnetic force will be sufficient to hold the contacts 140 and 144 together as the vehicle speed decreases until a point is reached when the torque developed by the spiral spring 104 exceeds the rotative force of the rotor by a predetermined amount. This feature provides controlled mechanical hysteresis to prevent hunting of the transmission with slight variations in vehicle speed.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

We claim:

1. In a transmission control system for a vehicle of the character driven by a throttle controlled engine, the combination comprising signal developing means for developing a signal voltage having a frequency proportional to vehicle speed, first force developing means connected with the signal developing means and responsive to the frequency of the signal voltage, the first force developing means being operative to develop a first force in accordance with the frequency, a vehicle throttle, second force developing means connecting the vehicle throttle with the first force developing means and operative to develop a second force in accordance with the throttle setting whereby the second force acts in a direction opposed to that of the first force, electrical switching means associated with the first and second force developing means and operative in response to the first and second forces, the electrical switching means being adapted to be switched to a first condition when the first force is greater than the second force, a relay coil and a voltage source connected together in series across the switching means so that when the switching means are switched to the first condition the relay coil is energized, and a ratio changing means operatively connected with and controlled by the relay coil for varying drive through the transmission.

2. In a transmission control system for a vehicle of the character driven by a throttle controlled engine, the combination comprising signal developing means for developing a signal voltage having a frequency proportional to vehicle speed, a torque motor connected with the signal developing means responsive to the frequency of the signal voltage and operative to develop a first torque in accordance with the frequency, a vehicle throttle, torque developing means connecting the vehicle throttle with the torque motor and operative to develop a second torque in accordance with the throttle setting whereby the second torque acts in a direction opposed to that of the first torque, an electrical switching means associated with the torque developing means and the torque motor and adapted to be switched to a first condition when the torque developed by the torque motor is greater than that developed by the torque developing means, a relay coil and a voltage source connected together in series across the switching means so that when the switching means are switched to the first condition the relay coil is energized, and a ratio changing means operatively connected with and controlled by the relay coil for varying drive through the transmission.

3. In a transmission control system for a vehicle of the character driven by a throttle controlled engine, the combination comprising a polyphase signal developing means for developing a polyphase signal voltage having a frequency proportional to vehicle speed, a torque motor including a stator and a rotor, the stator being mounted on a stationary member and having a polyphase winding mounted thereon, the winding being connected with the polyphase signal developing means whereby each phase of the winding receives a different phase of the signal voltage so as to provide rotative force to the rotor, a vehicle throttle, torque developing means connecting the throttle with the rotor so as to develop a torque in accordance with the throttle setting which acts in a direction to oppose rotation of the rotor, a first electrical contact mounted on the rotor of the torque motor and a second electrical contact mounted on the stationary member whereby the contacts are adapted to make electrical contact with each other when the rotative force of the rotor is greater than the torque developed by the torque developing means, a relay coil and a voltage source connected together in series across the contacts so that when the contacts make electrical contact with each other the relay coil is energized, and a ratio changing means operatively connected with and controlled by the relay coil for varying drive through the transmission.

4. In a transmission control system for a vehicle of the character driven by a throttle controlled engine, the combination comprising a polyphase signal developing means for developing a polyphase signal voltage having a frequency proportional to vehicle speed, a torque motor including a stator and a rotor, the stator being mounted on a stationary member and having a polyphase winding mounted thereon, the winding being connected with the polyphase signal developing means whereby each phase of the winding receives a different phase of the signal voltage developed by the signal developing means so as to provide rotative force to the rotor, impedance changing means connected in series with each phase of the polyphase winding so that the torque developed by the motor is proportional to the frequency of the signal voltage, a vehicle throttle, torque developing means connecting the throttle with the rotor and operative to develop a torque in accordance with the throttle setting whereby the torque acts in a direction to oppose rotation of the rotor, a first electrical contact mounted on the rotor and a second electrical contact mounted on the stationary member whereby the contacts are adapted to make electrical contact with each other when the rotative force of the rotor is greater than the torque developed by the torque developing means, a relay coil and a voltage source connected together in series across the contacts so that when the contacts make electrical contact with each other the relay coil is energized, and a ratio changing means operatively connected with and controlled by the relay coil for varying drive through the transmission.

5. In a transmission control system for a vehicle of the character driven by a throttle controlled engine, the combination comprising a polyphase signal developing means for developing a polyphase signal voltage having a frequency proportional to vehicle speed, a torque motor including a stator and a rotor, the stator being mounted on a stationary member and having a polyphase winding mounted thereon, the winding being connected with the polyphase signal developing means whereby each phase of the winding is excited by a different phase of the signal voltage so as to provide rotative force to the rotor, a capacitor connected in series with each phase of the polyphase winding so that the torque developed by the torque motor is proportional to the frequency of the signal voltage, a vehicle throttle, a spiral spring having one end connected with the throttle and the other end connected with the rotor and operative to develop a torque in a direction to oppose rotation of the rotor, a first electrical contact mounted on the rotor and a second electrical contact mounted on the stationary member whereby the contacts are adapted to make electrical contact with each other when the rotative force of the rotor is greater than the torque developed by the spiral spring, a relay coil and a voltage source connected in series across the contacts so that when the contacts make electrical contact with each other the relay coil is energized, and a ratio changing means operatively connected with and controlled by the relay coil for varying drive through the transmission.

6. In a transmission control system for a vehicle of the character driven by a throttle controlled engine, the combination comprising a polyphase signal developing means for developing a polyphase signal voltage having a frequency proportional to vehicle speed, a hysteresis motor including a stator and a rotor, the rotor being constructed of material exhibiting a high hysteretic constant, the stator being mounted on a stationary member, a polyphase winding mounted on the stator and connected with the polyphase signal developing means whereby each phase of the winding is excited by a different phase of the signal voltage so as to provide rotative force to the rotor, a capacitor connected in series with each phase of the polyphase winding so that the rotative force developed by the motor is proportional to the frequency of the signal voltage, a vehicle throttle, a spiral spring having one end connected with the throttle and the other end connected with the rotor and operative to develop a torque in accordance with the throttle setting whereby the torque acts to oppose rotation of the rotor, a first electrical contact mounted on the rotor and a second electrical contact mounted on the stationary member whereby the contacts are adapted to make electrical contact with each other when the rotative force of the rotor is greater than the torque developed by the spiral spring, a relay coil and a voltage source connected together in series across the contacts so that when the contacts make electrical contact with each other the relay coil is energized, and a ratio changing means operatively connected with and controlled by the relay coil for varying drive through the transmission.

7. In a transmission control system for a vehicle of the character driven by a throttle controlled engine, the combination comprising a polyphase signal developing means for developing a polyphase signal voltage having a frequency proportional to vehicle speed, a hysteresis motor including a stator and a rotor, the rotor being constructed of material exhibiting a high hysteretic constant, the stator being mounted on a stationary member, a polyphase winding mounted on the stator and connected with the polyphase signal developing means whereby each phase of the winding is excited by a different phase of the signal voltage so as to provide rotative force to the rotor, a capacitor connected in series with each phase of the polyphase winding so that the rotative force developed by the motor is proportional to the frequency of the signal voltage, a vehicle throttle, a spiral spring having one end connected with the throttle and the other end connected with the rotor and operative to develop a torque in accordance with the throttle setting whereby the torque acts to oppose rotation of the rotor, a first electrical contact mounted on the rotor and a second electrical contact mounted on the stationary member whereby the contacts are adapted to make electrical contact with each other when the rotative force of the rotor is greater than the torque developed by the spiral spring, a relay coil and a voltage source connected together in series across the contacts so that when the contacts make electrical contact with each other the relay coil is energized, a ratio changing means operatively connected with and controlled by the relay coil for varying drive through the transmission, and a contact holding relay coil connected in series with the voltage source across the contacts so that when the contacts make electrical contact with each other the holding relay coil is energized, the holding relay coil being operatively connected with the contacts and adapted to hold the contacts in electrical contact with each other upon energization of the holding relay coil until the torque developed by the spiral spring exceeds the rotative force of the rotor by a predetermined amount so as to prevent shifting of the ratio changing means with slight variations in vehicle speed.

8. In a transmission control system for a vehicle of the character driven by a throttle controlled engine, the combination comprising driving and driven shafts, planetary gearing interposed between the driving and driven shafts, hydraulically operated ratio changing mechanism for so conditioning the gearing to provide a plurality of drive ratios therethrough, a source of pressure fluid, a relay operated shift valve for supplying pressure fluid from the source to the ratio changing mechanism, a polyphase signal developing means for developing a polyphase signal voltage having a frequency proportional to vehicle speed, a hysteresis motor including a stator and a rotor, the rotor being constructed of material exhibiting a high hysteretic constant, the stator being mounted on a stationary member, a polyphase winding mounted on the stator and connected with the signal developing means whereby each phase of the winding is excited by a different phase of the signal voltage so as to provide rotative force to the rotor, a capacitor connected in series with each phase of the polyphase winding so that the rotative force developed by the motor is proportional to the frequency of the signal voltage, a vehicle throttle, a spiral spring having one end connected with the vehicle throttle and the other end connected with the rotor and operative to develop a torque in accordance with the throttle setting whereby the torque opposes rotation of the rotor, a first electrical contact mounted on the rotor and a second electrical contact mounted on the stationary member whereby the contacts are adapted to make electrical contact with each other when the rotative force of the rotor exceeds the torque developed by the spiral spring, a relay coil and a voltage source connected together in series across the contacts so that when the contacts make electrical contact with each other the relay coil is energized, and a contact holding relay coil connected in series with the voltage source across the contacts so that when the contacts make electrical contact with each other the holding relay coil is energized, the holding relay coil being operatively connected with the contacts and adapted to hold the contacts in electrical contact with each other upon energization of the holding relay coil until the torque developed by the spiral spring exceeds the rotative force of the rotor by a predetermined amount so as to prevent shifting of the ratio changing means with slight variations in vehicle speed.

9. In a transmission control system for an engine driven vehicle, the combination of ratio changing means for varying the drive ratio of the transmision, means developing a torque corresponding to vehicle speed, means developing a counter torque corresponding to the load demand on the engine, and means rendered operative at a certain algebraic sum of the torques from both of the torque developing means for causing the ratio changing means to alter the drive ratio.

10. In a transmission control system for an engine driven vehicle, the combination of ratio changing means for varying the drive ratio of the transmission, means developing an electrical effect corresponding in frequency to the speed of the vehicle, means responsive to the frequency of the electrical effect and operative to develop a mechanical torque reflecting the frequency, means developing a counter mechanical torque reflecting load demand on the engine, and means rendered operative at a certain algebraic sum of the mechanical torques from both of the torque generating means for causing the ratio changing means to vary the drive ratio.

References Cited by the Examiner

UNITED STATES PATENTS

| | | | |
|---|---|---|---|
| 2,888,543 | 5/1959 | Wilton | 200—110 |
| 2,895,030 | 7/1959 | Hotine | 200—110 |
| 3,036,177 | 5/1962 | Ewing | 200—110 |
| 3,068,715 | 12/1962 | Brennan et al. | |
| 3,088,337 | 5/1963 | Bemmann et al. | |

DON A. WAITE, *Primary Examiner.*